United States Patent [19]

Adams

[11] Patent Number: 5,491,465
[45] Date of Patent: Feb. 13, 1996

[54] TIRE AIR PRESSURE SYSTEM

[76] Inventor: Robert H. Adams, P.O. Box 102, Dupont, Ind. 47231

[21] Appl. No.: 337,755

[22] Filed: Nov. 14, 1994

[51] Int. Cl.⁶ .................................................. B60C 23/00
[52] U.S. Cl. .......................... 340/442; 340/443; 73/146.5; 116/34 R; 200/61.22
[58] Field of Search .................................. 340/442, 443, 340/445; 73/146.4, 146.5; 116/34 R; 200/61.22

[56] References Cited

U.S. PATENT DOCUMENTS

| | | |
|---|---|---|
| 1,140,937 | 5/1915 | Ashelman et al. |
| 1,167,980 | 1/1916 | Cole . |
| 1,975,639 | 10/1934 | Greene . |
| 2,445,959 | 7/1948 | Luper . |
| 2,846,664 | 8/1958 | Amundsen, Jr. . |
| 3,537,068 | 10/1970 | Amundsen, Jr. . |
| 3,757,294 | 9/1973 | Schultz . |
| 5,025,244 | 6/1991 | Huang ................................ 340/442 |
| 5,130,694 | 7/1992 | Zainaleian ......................... 340/442 |
| 5,289,161 | 2/1994 | Huang ................................ 340/442 |
| 5,349,328 | 9/1994 | Lonzaine ........................... 340/442 |

Primary Examiner—Brent A. Swarthout
Assistant Examiner—Nina Tong
Attorney, Agent, or Firm—Locke Reynolds

[57] ABSTRACT

A tire air pressure system is disclosed for continuously monitoring the pressure of air in an inflatable tire of a vehicle or aircraft, and activating an audio and/or visual alarm when the air pressure drops below a predetermined level. An electrically conducting sensor is attached to a tire valve stem, and a decrease in air pressure causes a normally electrically insulated, spring biased piston to contact the sensor, thereby grounding the piston. The piston is electrically connected to an insulated disk having a conducting ring, mounted between a wheel and a hub. A contact brush disposed at the ring is connected to an alarm maintained at positive potential.

11 Claims, 2 Drawing Sheets

TIRE AIR PRESSURE SYSTEM

BACKGROUND OF THE INVENTION

1. Field of the Invention

The present invention generally relates to systems for continuously monitoring the pressure of air in inflatable tires of vehicles and aircraft, and more particularly concerns tire air pressure systems that may be installed during the manufacture of the vehicle or aircraft or added as an after-market accessory, and are capable of safely, continuiously, and accurately monitoring the pressure of air in inflatable tires and activating an audio and/or visual warning when the pressure in a tire falls below a predetermined level.

2. Description of the Prior Art

The array of systems that may be used to continuously monitor the air pressure of inflatable tires of vehicles and aircraft includes those systems utilizing an electromechanical sensor, valve or similar disposed near a tire acting in response to a decrease in the air pressure of a tire. The electromechanical sensors and valves are frequently maintained at positive electrical potential, and act to close electrical contacts, completing an electrical circuit and thereby activating an audio and/or visual alarm. In this way, the operator of the vehicle or aircraft may be alerted to an impending dangerous condition. Such systems may utilize slip rings and brush contacts to provide electrical connection between a rotating tire and wheel and the vehicle or aircraft upon which the tire and wheel are mounted. A variety of electromechanical sensors and valves are used by such systems, including those systems where changes in air pressure causes movement of a flexible diaphram, such as those described by U.S. Pat. Nos. 1,140,937, 2,445,664, and 2,846,664, a bellows, such as those described by U.S. Pat. Nos. 1,975,639 and 3,537,068, a metal disk, such as that described by U.S. Pat. No. 1,167,980, or a piston, such as that described by U.S. Pat. No. 3,757,294.

Unfortunately, such existing systems may be difficult or impossible to incorporate for use with a vehicle or aircraft as an after-market accessory, or may require extensive, time consuming and costly modification of wheels, axles or other components. In addition, thoses systems utilizing diaphrams or bellows may be subject to rapid wear, fatigue, or failure, especially in extreme weather environments. Moreover, in those systems where components proximate to wheels are maintained at a positive electrical potential, the danger of electrical shocks and failures is present.

Despite the availability of such systems, there exists a need in the art for a tire air pressure system that is capable of reliably and continuously monitoring the pressure of air in an inflatable tire while minimizing the danger of electrical shock, yet may be easily installed as an after-market accessory.

SUMMARY OF THE INVENTION

In order to aid in the understanding of the present invention, it can be stated in essentially summary form that it is directed to a tire air pressure system that continuiously monitors the pressure of air in the inflatable tires of a vehicle or aircraft and activates alarms when the air pressure falls below predetermined limits, yet is capable of safe and reliable use.

It is an object of the present invention to provide a tire air pressure system that is capable of continuiously monitoring the air pressure in inflatable tires of a variety of vehicles and aircraft.

It is another object of the present invention to provide a tire air pressure system that is capable of activating an audio and/or visual alarm when the air pressure in an inflatable tire falls below a predetermined limit.

It is another object of the present invention to provide a tire air pressure system that is capable of use with a minimal risk of electrical shock.

It is another object of the present invention to provide a tire air pressure system that is reliable, yet produces a minimal number of false alarms indicating low air pressure.

It is another object of the present invention to provide a tire air pressure system that is capable of being installed during manufacture of a vehicle or aircraft or as an after-market accessory.

It is another object of the present invention to provide a tire air pressure system that is capable of rapid and easy disassembly, cleaning and reassembly.

It is still another object of the present invention to provide a tire air pressure system that is inexpensive to produce.

It is yet another object of the present invention to provide a tire air pressure system of relatively simple construction with a minimum of components.

Further objects and advantages of the present invention will be apparent from a study of the following portion of the specification, the claims, and the attached drawings.

DESCRIPTION OF THE PREFERRED EMBODIMENTS

Figure 3:
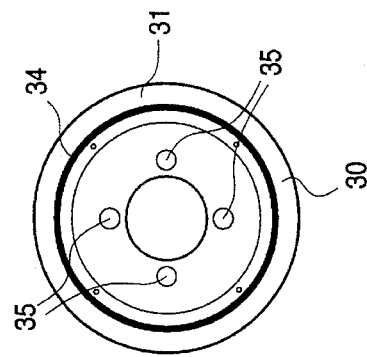
FIG. 3 is a side view of the insulating disk portion of the present invention.

The following portion of the specification, taken in conjunction with the drawings, sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Referring now to the drawings for a detailed description of the present invention, reference is first made to FIGS. 1, 2, 4, and 5, depicting tire 10 having electrically conductive valve stem 11 mounted on wheel 12 having valve stem hole, not shown, so that valve stem 11 is disposed through said valve stem hole. Wheel 12 is attached to hub 13 by lug nuts 14 and lug bolts 19. Hub 13 is mounted on axle 15, and axle 15 is attached to frame member 16. Brake caliper 17 is mounted at brake rotor 18. Electrical contact brush 20 is held in place proximate to hub 13 by electrical cable 21. Cable 21 is attached to insulated annuciator wire 22 at connection nut 23 so that cable 21 and annunciator wire 22 are electrically insulated from frame member 16.

Figure 2:
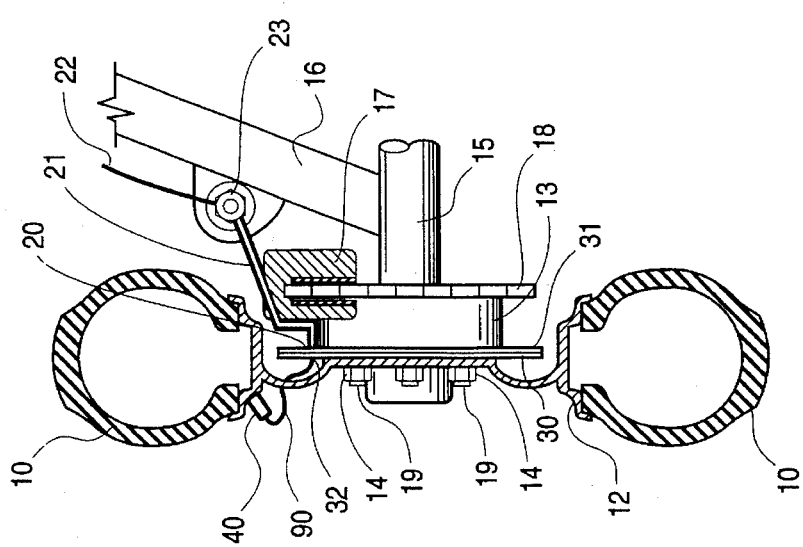
FIG. 2 is a section view taken along line 2—2 of FIG. 1.
Figure 1:
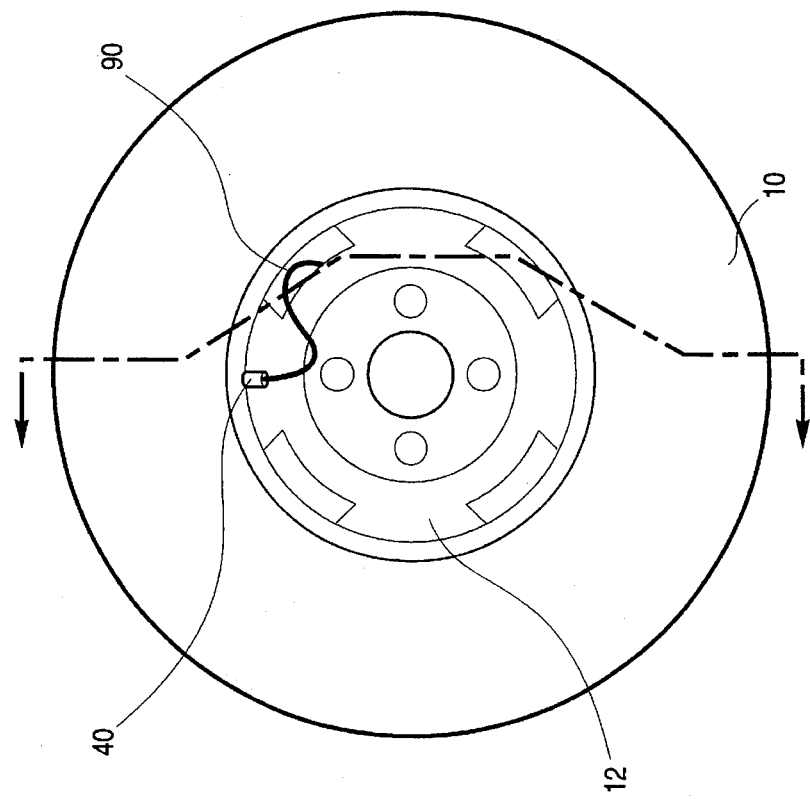
FIG. 1 is a side view of an inflatable tire mounted on a wheel representing the sensor portion of the present invention.
Figure 6:
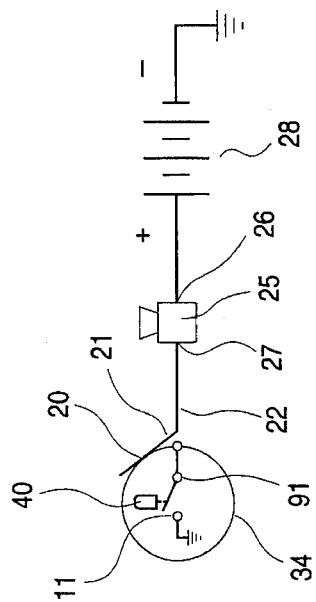
FIG. 6 is a schematic circuit diagram of the representing the present invention.
Figure 5:
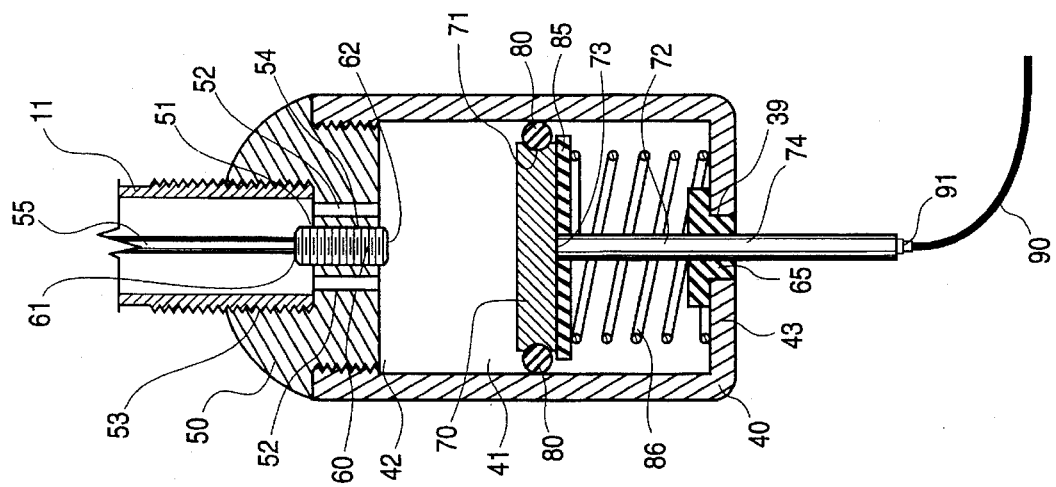
FIG. 5 is a detail section view representing the sensor portion of the present invention in the open position.

As shown in FIGS. 2 and 6, annunciator 25 having first terminal 26 and second terminal 27 is electrically connected to external direct current voltage source 28 so that first terminal 26 is connected to the positive terminal of voltage source 28 and second terminal 27 is connected to brush 20 by way of annunciator wire 22 and cable 21. The negative terminal of voltage source 28 is connected to the vehicle or aircraft frame, so that frame member 16, hub 13 and wheel 12 are in electrical contact and maintained at electrical ground. Annunciator 25 may be audio and/or visual in nature, and is typically located near the operator of the vehicle or aircraft.

Referring now to FIGS. 2 and 3, electrically insulating annular disk 30 having planar first surface 31 and wire lead hole 32 is demountably and concentrically interposed between wheel 12 and hub 13 by fitting lug holes 35 over lug bolts 19 so that first surface 31 is proximate to hub 13. Wire lead hole 32 is disposed through disk 30. Electrically conductive flattened slip ring 34 is attached to first surface 31 concentric with disk 30, proximate to wire lead hole 32, and disposed in sliding contact with brush 20.

As shown in FIGS. 1, 2, 4, and 5, electrically conducting sensor housing 40 has cylindrical bore 41 and bushing hole 39, with cylindrical bore 41 having open cap end 42 and opposing closed end 43. Bushing hole 39 is disposed through sensor housing 40 at closed end 43 and coaxially with respect to cylindrical bore 41. Electrically conducting sensor cap 50 has stepped-bore aperture 51 and a plurality of air passages 52, with aperture 51 having threaded valve stem bore 53 and threaded adjustment screw bore 54. Aperture 51 and air passages 52 are disposed through sensor cap 50, and sensor cap 50 is threadably attached to sensor housing 40 so that aperture 51 is coaxial with cylindrical bore 41, adjustment screw bore 54 is adjacent to cylindrical bore 41. As will be described in more detail, valve stem bore 53 is threadably engaged with valve stem 11. Air passages 52 are disposed to permit air to pass from valve stem 11 into cylindrical bore 41.

Figure 4:
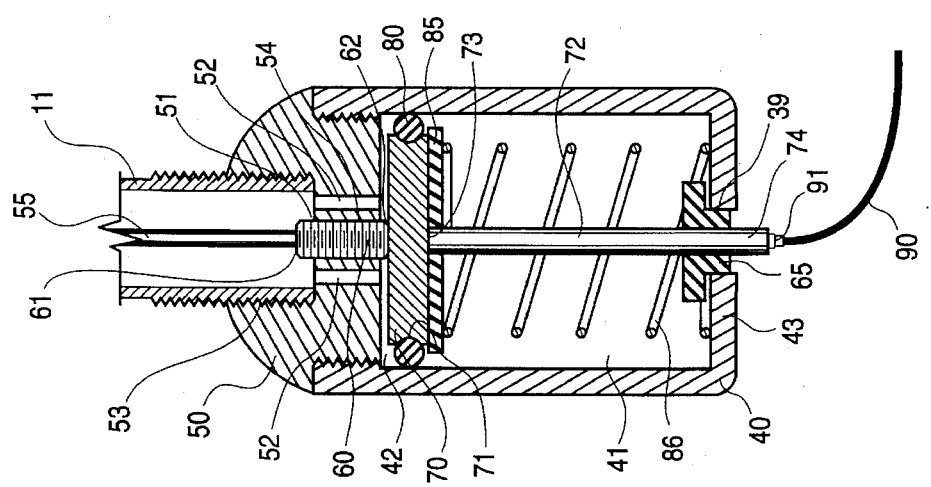
FIG. 4 is a detail section view representing the sensor portion of the present invention in the closed position.

As depicted in FIGS. 3 and 4, electrically conducting adjustment screw 60 has screw first end 61 and screw second end 62, with adjustment screw 60 threadably disposed in adjustment screw bore 54. The length of adjustment screw 60 is chosen so that screw first end 61 projects into valve stem bore 53, and contacts and depresses valve core plunger 55, and screw second end 62 projects through sensor cap 50 and into cylindrical bore 41. Electrically insulating bushing 65 is disposed within bushing hole 39 so that the axis of bushing 65 is coaxial with the axis of cylindrical bore 41. Electrically conducting piston head 70 having circumferential slot 71 is disposed coaxially with respect to and within cylindrical bore 41, with the diameter of piston head 70 chosen to be slightly less than the diameter of cylindrical bore 41. Electrically conducting piston shaft 72 has piston shaft first end 73 and piston shaft second end 74, with piston shaft first end 73 attached to piston head 70 so that piston shaft 72 is normal to and coaxial with piston head 70 and piston shaft second end 74 is slidably disposed through bushing 65. Electrically insulating, flexible, resilient O-ring 80 is disposed surrounding piston head 70 in slot 71, with the thickness of O-ring 80 chosen so that O-ring 80 forms an airtight seal with respect to cylindrical bore 41 while permitting sliding coaxial movement of piston head 70 with respect to cylindrical bore 41. Electrically insulating washer 85 is disposed around piston shaft 72 adjacent to piston head 70. Coil spring 86 is disposed surrounding piston shaft 72 and interposed between insulating washer 85 and bushing 65 so that piston head 70 is biased away from bushing 65. Insulated lead wire 90 is disposed through wire lead hole 32, electrically connecting piston shaft second end 74 by way of connector 91 and ring 34.

In a second embodiment, where valve stem is formed of electrically insulating materials, an electrically conductive sheath, not shown, is disposed surrounding valve stem 11 and interposed between sensor cap 50 and wheel 12, thereby electrically connecting sensor cap 50 to wheel 12.

In use, the present invention is may be installed by removing wheel 12 and tire 10 from a vehicle or aircraft, placing disk 30 between wheel 12 and hub 13 by fitting lug holes 35 over lug bolts 19 with first surface 31 proximate to hub 13 so that brush 20 is in sliding contact with ring 34. Sensor cap 50 is attached to valve stem 11 by threaded engagement with valve stem bore 53. Adjustment screw 60 is adjusted so that screw first end 61 depresses valve core plunger 55 permitting air to pass from valve stem 11 into cylindrical bore 41, causing piston head 70 to move away from screw second end 62. As the air pressure in tire 10 decreases, the pressure against piston head 70 decreases, causing piston head 70 to move relatively closer to screw second end 62 due to the urging of coil spring 86. As air pressure decreases further, piston head 70 comes into physical and electrical contact with screw second end 62. By adjusting adjustment screw 60, the level of air pressure necessary to cause piston head 70 to be separated from adjustment screw 60 may be predetermined as suitable for a particular application. Piston head 70 and piston shaft 72 are electrically insulated from sensor housing 40 and coil spring 86 by O-ring 80, washer 85 and bushing 65. Adjustment screw 60 is maintained at electrical ground by contact with sensor cap 50, as sensor cap 50 is in electrical contact with conductive valve stem 11 or, in the second embodiment, said conductive sheath. Valve stem 11 or said conductive sheath are in turn in electrical contact with wheel 12, and wheel 10 is in electrical contact with the electrically grounded vehicle or aircraft frame. As piston head 70 contacts screw second end 62, piston shaft 72, lead wire 90, ring 34, brush 20, cable 21, annunciator wire 22 and second terminal 27 all become electrically grounded, causing annunciator 25 to alert the operator of the vehicle or aircraft that air pressure in tire 10 has fallen below the predetermined limit.

At all times, sensor cap 50 and sensor housing 40 are maintained at electrical ground. During normal operation of the present invention, that is, when piston head 70 is not in contact with adjustment screw 60, piston head 70, piston shaft 72, lead wire 90, ring 34, brush 20, cable 21, annunciator wire 22 and second terminal 27 all have no applied electrical potential. As discussed previously, when piston head 70 comes into contact with adjustment screw 60, piston head 70, piston shaft 72, lead wire 90, ring 34, brush 20, cable 21, annunciator wire 22 and second terminal 27 become grounded. First terminal 26 of annunciator 25 is the only portion of the present invention maintained at a positive electrical potential, due to connection to the positive terminal of voltage source 28. In addition, annunciator 25 is positioned within the vehicle or aircraft, away from weather, road hazards and accidential contact. In this way, the chance of electrical shock and failure is minimized.

Although the present invention has been described with respect to the air pressure of a single tire, it will be understood that each tire of a vehicle or aircraft may be similarly monitored, with individual annunciators for each tire, or, alternatively, with a single annunciator electrically connected to all monitored tires.

The present invention having been described in its preferred embodiments it is clear that it is susceptible to numerous modifications and embodiments within the ability of those skilled in the art and without the exercise of the inventive faculty.

What is claimed is:

1. An improved inflatable tire air pressure monitoring system of the type having a valve stem having a valve core plunger, said valve stem attached to said tire;

a hub;

a wheel having a valve stem hole, said tire mounted on said wheel so that said valve stem is disposed through said valve stem hole, and said wheel mounted on said hub;

an electrical contact brush;

means for attaching said brush proximate to said hub;

an annunciator having a first terminal and a second terminal;

an external direct current voltage source;

means for electrically connecting said first terminal to the positive terminal said voltage source;

means for electrically connecting said wheel to the negative terminal said voltage source; and means for electrically connecting said second terminal to said brush;

wherein the improvement comprises:

an electrically insulating annular disk having a planar first surface and a wire lead hole, said disk demountably and concentrically interposed between said wheel and said hub so that said first surface is proximate to said hub, and said wire lead hole disposed through said disk;

a electrically conductive flattened ring attached to said first surface concentric with said disk, proximate to said wire lead hole, and disposed in sliding contact with said brush;

an electrically conducting sensor housing having a cylindrical cavity, a stepped-bore aperture, a bushing hole, and a plurality of air passages, said aperture having a threaded valve stem bore and a threaded adjustment screw bore, said aperture disposed through said sensor housing so that said aperture is coaxial with said cylindrical cavity, said adjustment screw bore is adjacent to said cylindrical cavity, said bushing hole disposed through said sensor housing, coaxial with and adjacent to said cylindrical cavity opposing said adjustment screw bore, said valve stem bore threadably engaged with said valve stem, said air passages disposed through said sensor housing and proximate to said valve stem bore so that air may flow from said valve stem into said cylindrical cavity;

an electrically conducting adjustment screw having a screw first end and a screw second end, said adjustment screw disposed in said adjustment screw bore, the length of said adjustment screw chosen so that said screw first end projects into said valve stem bore, contacts and depresses said valve core plunger and said screw second end projects into said cylindrical cavity;

an electrically insulating bushing disposed within said bushing hole so that the axis of said bushing is coaxial with the axis of said cylindrical cavity;

an electrically conducting piston head having a circumferential slot, said piston head disposed coaxially with respect to and within said cylindrical cavity, the diameter of said piston head chosen to be slightly less than the diameter of said cylindrical cavity;

an electrically conducting piston shaft having a piston shaft first end and a piston shaft second end, said piston shaft first end attached to said piston head so that said piston shaft is normal to and coaxial with said piston head and said piston shaft second end is slidably disposed through said bushing;

an electrically insulating, flexible, resilient O-ring, disposed surrounding said piston head in said circumferential slot, the thickness of said O-ring chosen so that said O-ring forms an airtight seal with respect to said cylindrical cavity while permitting sliding coaxial movement of said piston head with respect to said cylindrical cavity;

means for biasing said piston head away from said bushing so that said piston head is electrically insulated from said sensor housing;

means for electrically connecting said piston shaft second end to said ring; and means for electrically connecting said sensor housing to said wheel.

2. An improved tire air pressure system as defined in claim 1, wherein said means for biasing said piston head away from said bushing comprises:

an electrically insulating washer disposed around said piston shaft and adjacent to said piston head; and a coil spring disposed surrounding said piston shaft and interposed between said insulating washer and said bushing so that said piston head is biased away from said bushing.

3. An improved tire air pressure system as defined in claim 2, wherein said means for electrically connecting said piston shaft second end to said ring comprises an insulated lead wire disposed through said wire lead hole, electrically connecting said piston shaft second end and said ring.

4. An improved tire air pressure system as defined in claim 3, wherein said means for electrically connecting said sensor housing to said wheel comprises forming said valve stem from an electrically conducting material.

5. An improved tire air pressure system as defined in claim 3, wherein said means for electrically connecting said sensor housing to said wheel comprises an electrically conducting sheath disposed surrounding said valve stem and interposed between said sensor housing and said wheel.

6. An improved inflatable tire air pressure monitoring system of the type having a valve stem having a valve core plunger, said valve stem attached to said tire;

a hub;

a wheel having a valve stem hole, said tire mounted on said wheel so that said valve stem is disposed through said valve stem hole, and said wheel mounted on said hub;

an electrical contact brush;

means for attaching said brush proximate to said hub;

an annunciator having a first terminal and a second terminal;

an external direct current voltage source;

means for electrically connecting said first terminal to the positive terminal said voltage source;

means for electrically connecting said wheel to the negative terminal said voltage source; and means for electrically connecting said second terminal to said brush;

wherein the improvement comprises:

an electrically insulating annular disk having a planar first surface and a wire lead hole, said disk demountably and concentrically interposed between said wheel and said hub so that said first surface is proximate to said hub, and said wire lead hole disposed through said disk;

a electrically conductive flattened ring attached to said first surface concentric with said disk, proximate to said wire lead hole, and disposed in sliding contact with said brush;

a sensor housing having a cylindrical bore and a bushing hole, said cylindrical bore having an open cap end and an opposing closed end, and said bushing hole disposed coaxial with said cylindrical bore and through said sensor housing at said closed end;

an electrically conducting sensor cap having a stepped-bore aperture and a plurality of air passages, said aperture having a threaded valve stem bore and a threaded adjustment screw bore, said aperture and said air passages disposed through said sensor cap, and said sensor cap attached to said sensor housing so that said aperture is coaxial with said cylindrical bore, said adjustment screw bore is adjacent to said cylindrical bore, said valve stem bore is threadably engaged with said valve stem, and said air passages disposed to permit air to pass from said valve stem into said cylindrical bore;

an electrically conducting adjustment screw having a screw first end and a screw second end, said adjustment screw disposed in said adjustment screw bore, the length of said adjustment screw chosen so that said screw first end projects into said valve stem bore, contacts and depresses said valve core plunger and said screw second end projects through said sensor cap and into said cylindrical bore;

an electrically insulating bushing disposed within said bushing hole so that the axis of said bushing is coaxial with the axis of said cylindrical bore;

an electrically conducting piston head having a circumferential slot, said piston head disposed coaxially with respect to and within said cylindrical bore, the diameter of said piston head chosen to be slightly less than the diameter of said cylindrical bore;

an electrically conducting piston shaft having a piston shaft first end and a piston shaft second end, said piston shaft first end attached to said piston head so that said piston shaft is normal to and coaxial with said piston head and said piston shaft second end is slidably disposed through said bushing;

an electrically insulating, flexible, resilient O-ring, disposed surrounding said piston head in said circumferential slot, the thickness of said O-ring chosen so that said O-ring forms an airtight seal with respect to said cylindrical bore while permitting sliding coaxial movement of said piston head with respect to said cylindrical bore;

means for biasing said piston head away from said bushing so that said piston head is electrically insulated from said sensor housing;

means for electrically connecting said piston shaft second end to said ring; and means for electrically connecting said sensor cap to said wheel.

7. An improved tire air pressure system as defined in claim 6, wherein said means for biasing said piston head away from said bushing comprises:

an electrically insulating washer disposed around said piston shaft and adjacent to said piston head; and a coil spring disposed surrounding said piston shaft and interposed between said insulating washer and said bushing so that said piston head is biased away from said bushing.

8. An improved tire air pressure system as defined in claim 6, wherein said means for electrically connecting said piston shaft second end to said ring comprises an insulated lead wire disposed through said wire lead hole, electrically connecting said piston shaft second end and said ring, disposed through said wire lead hole.

9. An improved tire air pressure system as defined in claim 6, wherein said means for electrically connecting said sensor cap to said wheel comprises an electrically conducting sheath disposed surrounding said valve stem and interposed between said sensor cap and said wheel.

10. An improved tire air pressure system as defined in claim 6, wherein said means for electrically connecting said sensor cap to said wheel comprises forming said valve stem from an electrically conducting material.

11. An improved inflatable tire air pressure monitoring system of the type having an electrically conductive valve stem having a valve core plunger, said valve stem attached to said tire;

a hub;

a wheel having a valve stem hole, said tire mounted on said wheel so that said valve stem is disposed through said valve stem hole, and said wheel mounted on said hub;

an electrical contact brush;

means for attaching said brush proximate to said hub;

an annunciator having a first terminal and a second terminal;

an external direct current voltage source;

means for electrically connecting said first terminal to the positive terminal said voltage source;

means for electrically connecting said wheel to the negative terminal said voltage source; and means for electrically connecting said second terminal to said brush;

wherein the improvement comprises:

an electrically insulating annular disk having a planar first surface and a wire lead hole, said disk demountably and concentrically interposed between said wheel and said hub so that said first surface is proximate to said hub, and said wire lead hole disposed through said disk;

a electrically conductive flattened ring attached to said first surface concentric with said disk, proximate to said wire lead hole, and disposed in sliding contact with said brush;

a sensor housing having a cylindrical bore and a bushing hole, said cylindrical bore having an open cap end and an opposing closed end, and said bushing hole disposed coaxial with said cylindrical bore and through said sensor housing at said closed end;

an electrically conducting sensor cap having a stepped-bore aperture and a plurality of air passages, said aperture having a threaded valve stem bore and a threaded adjustment screw bore, said aperture and said air passages disposed through said sensor cap, and said sensor cap attached to said sensor housing so that said aperture is coaxial with said cylindrical bore, said adjustment screw bore is adjacent to said cylindrical bore, said valve stem bore is threadably engaged with said valve stem, and said air passages disposed to permit air to pass from said valve stem into said cylindrical bore;

an electrically conducting adjustment screw having a screw first end and a screw second end, said adjustment screw disposed in said adjustment screw bore, the length of said adjustment screw chosen so that said screw first end projects into said valve stem bore, contacts and depresses said valve core plunger and said screw second end projects through said sensor cap and into said cylindrical bore;

an electrically insulating bushing disposed within said bushing hole so that the axis of said bushing is coaxial with the axis of said cylindrical bore;

an electrically conducting piston head having a circumferential slot, said piston head disposed coaxially with respect to and within said cylindrical bore, the diameter of said piston head chosen to be slightly less than the diameter of said cylindrical bore;

an electrically conducting piston shaft having a piston shaft first end and a piston shaft second end, said piston shaft first end attached to said piston head so that said piston shaft is normal to and coaxial with said piston head and said piston shaft second end is slidably disposed through said bushing;

an electrically insulating, flexible, resilient O-ring, disposed surrounding said piston head in said circumferential slot, the thickness of said O-ring chosen so that said O-ring forms an airtight seal with respect to said cylindrical bore while permitting sliding coaxial movement of said piston head with respect to said cylindrical bore;

an electrically insulating washer disposed around said piston shaft and adjacent to said piston head;

a coil spring disposed surrounding said piston shaft and interposed between said insulating washer and said bushing so that said piston head is biased away from said bushing; and an insulated lead wire disposed through said wire lead hole, electrically connecting said piston shaft second end and said ring.

* * * * *